DRAFTSMAN.
J. F. Pond,
Washing Machine,
No. 273. A. I. Mar. 27, 1860.
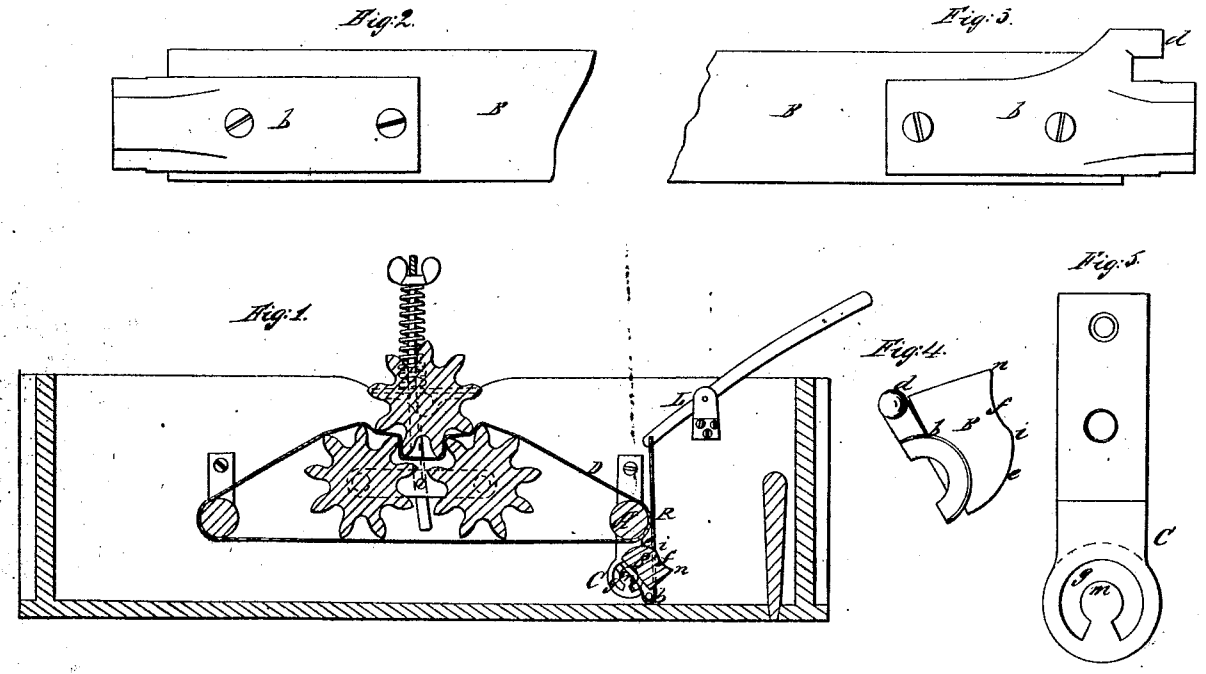
Witnesses:
Geo Patten
Inventor:
Joseph F. Pond
N. PETERS, PHOTO-LITHOGRAPHER, WASHINGTON, D. C.